Jan. 18, 1949.   W. W. GETTYS   2,459,373
V-BELT CLUTCHING DEVICE
Filed June 8, 1945
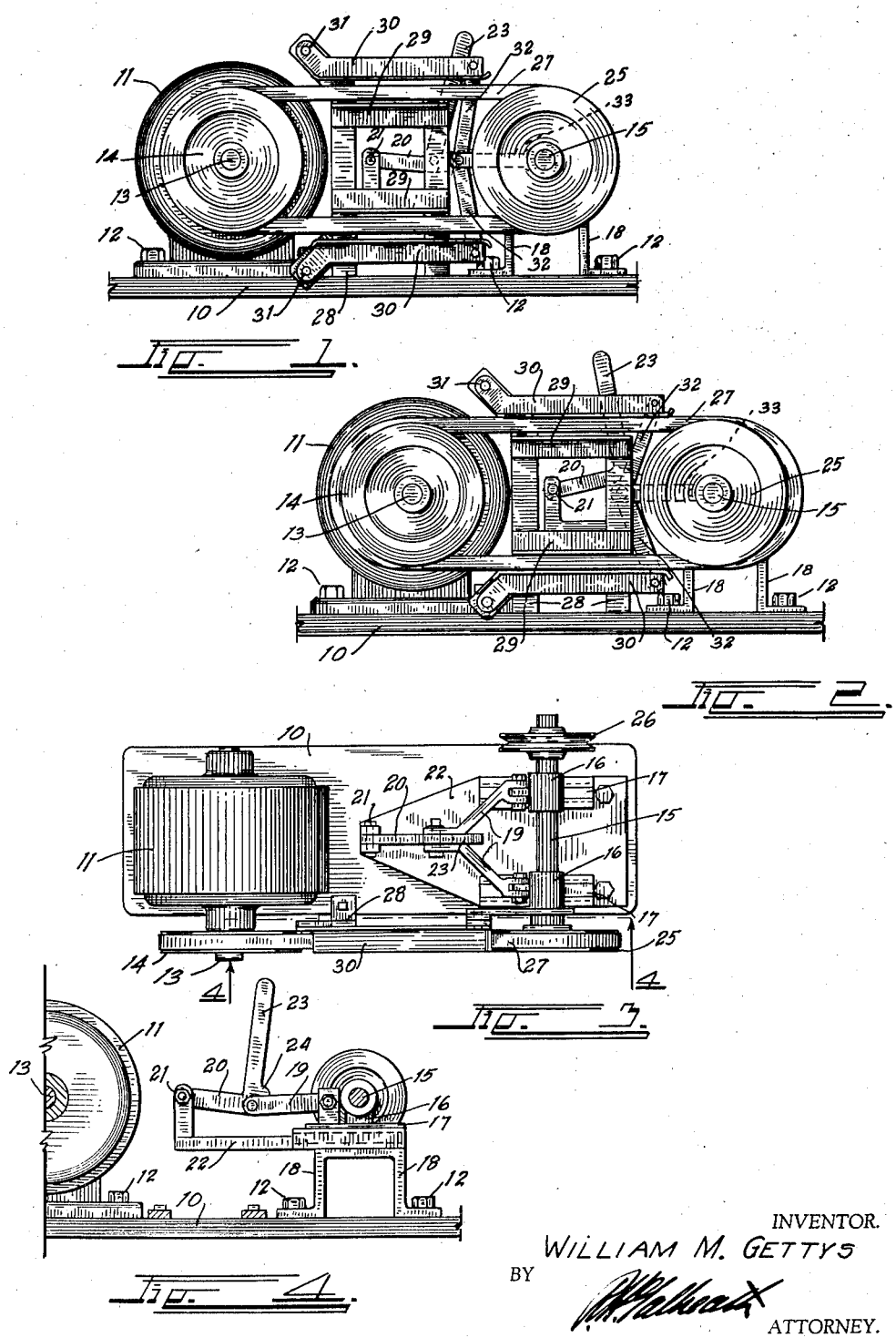
INVENTOR.
WILLIAM M. GETTYS
BY
ATTORNEY.

Patented Jan. 18, 1949

2,459,373

UNITED STATES PATENT OFFICE 2,459,373

V-BELT CLUTCHING DEVICE

William W. Gettys, Greeley, Colo.

Application June 8, 1945, Serial No. 598,367

4 Claims. (Cl. 74—242.14)

This invention relates to what might be termed a V-belt clutch. One of the difficulties encountered with V-belts is the inability to shift them from tight to loose pulleys for clutching purposes for operating various machines, such as lathes, etc. as is done with flat belts. Due to the characteristics of a V-belt, it is also impossible to move the two pulleys closer together to allow the belt to ride freely thereover as can be done with a flat belt for the V-belt will retain its gripping qualities regardless of its looseness.

The principal object of this invention is to provide a device which will allow instant disconnection from a V-belt by a slight movement of the V-belt pulleys toward each other so that any machine may be started and stopped with the stopping or starting of the drive shaft or motor.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of one form of the improved V-belt clutching device illustrating it in the driving position;

Fig. 2 is a similar view illustrating the device in the disconnected or idle position;

Fig. 3 is a plan view of the device of Fig. 1; and

Fig. 4 is a detail section, taken on the line 4—4, Fig. 3.

For purposes of illustration, the device is illustrated mounted directly on a drive motor. It could, however, be employed in connection with a drive shaft or any other driving mechanism.

As illustrated, the improved V-belt clutching device employs a base 10 upon which a drive motor 11 is mounted by means of suitable attachment screws 12. The motor rotates a motor or drive shaft 13 upon which a drive pulley 14 is secured. The drive pulley may be any standard type of V-belt pulley of any desired diameter.

A driven shaft 15 is mounted in parallel relation to the drive shaft 13 in sliding bearings 16. The bearings 16 are slidably mounted in slides 17 carried on supporting brackets 18. This construction allows the driven shaft 15 to be moved toward or away from the motor 11.

The movement is accomplished by means of a pair of toggle links 19 and an L-shaped toggle lever 20. Each of the links 19 is secured at one of its extremities to one of the bearings 16. The other extremities of the links 19 are secured at the angle of the lever 20. One extremity of the lever 20 is hingedly mounted at 21 on a supporting plate 22 secured to the slides 17. The other extremity of the lever 20 extends upwardly to form an operating handle 23.

It can be seen that if the lever 23 is swung to the left, it will draw the shaft 15 toward the motor 11 and if swung to the right, will force the shaft 15 away from the motor. In moving to the right, the levers 19 and 20 pass below the "dead center" position against a stop member 24 so that the shafts are automatically locked in the separated position.

The shaft 15 carries a V-belt clutch pulley 25 at one extremity. The other extremity is arranged in any desired manner for driving any given mechanism. It may be connected with a flexible shaft (not shown) for driving portable machines such as sheep shears, grinders, etc. or it may be provided with a V-belt pulley 26 for driving any desired device by means of a V-belt. An endless V-belt 27 is trained between the pulleys 14 and 25. A supporting frame 28 is carried by the base adjacent the belt 27. This frame supports two inner belt guides 29 in spaced relation to the inner faces of the intermediate reaches of the belt 27. Two outer guides 30 are held in spaced relation to the outer faces of the reaches of the belt 27. The outer guides are pivoted, as shown at 31, adjacent their one extremity and are supported from toggle levers 32 adjacent their other extremity. The levers 32 are pivotally secured together on the extremity of a connecting link 33 which extends to a connection with either one of the bearings 16 on the shaft 15.

It can be readily seen that when the shaft 15 is forced away from the shaft 13, the toggle levers 32 will force the free extremities of the outer guides 30 away from each other, as shown in Fig. 1, and when the shaft 15 approaches the shaft 13, these extremities will be drawn together as shown in Fig. 2.

In the usual V-belt drive, one pulley may be moved toward the other pulley for a considerable distance without affecting the driving power of the belt since the intermediate reaches of the belt will simply spread apart so that the extremities will retain their grip in the V-grooves of the pulleys. In this device, however, the belt is prevented from separating or spreading intermediate the pulleys. Therefore, if one shaft is forced toward the other, the pulleys will move away from the end loops of the belt so that the latter will disengage from the V-grooves of the pulleys.

In actual practice, a movement of three-sixteenths of an inch in the shaft 15 will completely release the belt from the pulleys so that the shaft 15 will immediately come to rest while the motor 11 continues to operate. Without the guides 30, however, the shaft 15 can be moved toward the shaft 13 as much as three inches without affecting the power of the drive. This is due to the fact that the outer guides 30 prevent the two intermediate reaches of the belt from spreading intermediate the pulleys as the latter approach each other. Therefore, the looped ends of the belt cannot follow the pulleys and the latter will move away from the belt as indicated in Fig. 2. The major movement is usually away from the drive pulley due to the motion of the latter so that the belt will also come to rest. The guides 30 also frictionally engage the belt and act as a brake to quickly bring it to rest.

The inner guides 29 ordinarily are never contacted by the belt but are employed to prevent the intermediate reaches of the belt from arching inwardly as the shafts approach each other. The usual arching tendency, however, is outward due to the centrifugal action of the belt.

Therefore, when the operating lever 23 is moved to the position of Fig. 2, the shaft 15 comes to rest and when the lever 23 is moved to the position of Fig. 1, the shaft 15 drives with full power.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A V-belt clutching device comprising: a drive shaft; a V-belt drive pulley on said drive shaft; a driven shaft; a V-belt driven pulley on said driven shaft; an endless V-belt surrounding both pulleys; means for causing said shafts to approach each other when desired; and a guide member positioned in spaced relation to the outer face of said belt intermediate said pulleys, said guide member being pivoted at its one extremity; and means operable from said means for causing said shafts to approach each other and connected with said guide member for swinging the latter on its pivot toward said belt to prevent said belt from moving outwardly as said shafts approach each other.

2. A V-belt clutching device comprising: a drive shaft; a V-belt drive pulley on said drive shaft; a driven shaft; a V-belt driven pulley on said driven shaft; an endless V-belt surrounding both pulleys; means for causing said shafts to approach each other when desired; and guide means adajacent the inner and outer faces of said belt to prevent lateral movement thereof as said shafts approach each other.

3. A V-belt clutching device comprising: a drive shaft; a V-belt drive pulley on said drive shaft; a driven shaft; a V-belt driven pulley on said driven shaft; an endless V-belt surrounding both pulleys; means for causing said shafts to approach each other when desired; a guide member positioned in spaced relation to the outer face of said belt intermediate said pulleys to prevent said belt from moving outwardly as said shafts approach each other; and means for causing said guide member to approach said belt as the space between said shafts lessens.

4. A V-belt clutching device for transmitting power from a drive shaft to a driven shaft comprising: a V-belt drive pulley on said drive shaft; a V-belt driven pulley on said driven shaft; an endless V-belt surrounding both pulleys; means for moving one of said shafts toward the other; fixed inner guide members lying in parallel, spaced relation to the inner faces of said belt between said pulleys to limit the inward movement of the belt between said pulleys; swinging outer guide members positioned in spaced relation to the outer faces of said belt between said pulleys; pivot means supporting one extremity of each of said outer guide members; toggle links connecting the other extremities of said outer guide members; and a connecting link between said toggle links and the movable shaft for causing the toggle links to draw said outer guide members toward said belt as said shafts approach each other to exert a braking action thereon.

WILLIAM M. GETTYS.

REFERENCES CITED

The following references are of record in the file of this patent:

UNITED STATES PATENTS

| Number | Name | Date |
|---|---|---|
| 1,551,377 | Dunlap et al. | Aug. 25, 1925 |
| 2,089,381 | Kassing | Aug. 10, 1937 |
| 2,156,701 | Petersen | May 2, 1939 |